United States Patent [19]

Kanota et al.

[11] Patent Number: 4,984,099

[45] Date of Patent: Jan. 8, 1991

[54] APPARATUS FOR DECODING A TRANSMITTED SIGNAL

[75] Inventors: Keiji Kanota, Kanagawa; Hajime Inoue, Tokyo; Takahito Seki, Kanagawa, all of Japan

[73] Assignee: Sony Corporation, Tokyo, Japan

[21] Appl. No.: 354,031

[22] Filed: May 19, 1989

[30] Foreign Application Priority Data

May 25, 1988 [JP] Japan .................................. 63-127888

[51] Int. Cl.$^5$ .................................................. G11B 5/09
[52] U.S. Cl. ...................................................... 360/46
[58] Field of Search ...................... 360/41, 51, 46, 67, 360/65

[56] References Cited

U.S. PATENT DOCUMENTS

| | | | |
|---|---|---|---|
| 4,504,872 | 3/1985 | Petersen | 360/40 |
| 4,509,185 | 4/1985 | Grunberg | 360/32 |
| 4,564,870 | 1/1986 | Kitamura | 360/67 |
| 4,613,913 | 9/1986 | Phillips | 360/41 |
| 4,618,941 | 10/1986 | Linder et al. | 360/41 |
| 4,635,143 | 1/1987 | Suzuki et al. | 360/65 |
| 4,707,841 | 11/1987 | Yen et al. | 360/51 |
| 4,725,901 | 2/1988 | Eiberger et al. | 360/46 |
| 4,726,067 | 2/1988 | Alonso | 360/32 |

Primary Examiner—Vincent P. Canney
Attorney, Agent, or Firm—Alvin Sinderbrand

[57] ABSTRACT

An apparatus for decoding a transmitted signal has a receiver for receiving the transmitted signal, a filter for limiting the frequency of the output of the receiver below a predetermined frequency, a generator for generating a clock signal having a frequency equal to a transmitting rate of the signal output from the receiver, a converter for sampling the output of the filter at a frequency defined by the clock signal and for converting the filter output into a binary signal, and a processor for decoding the binary signal according to a predetermined system.

1 Claim, 2 Drawing Sheets

APPARATUS FOR DECODING A TRANSMITTED SIGNAL

BACKGROUND OF THE INVENTION

1. Field of the Invention

The present invention relates generally to an apparatus for decoding a signal and, more particularly, is directed to an apparatus for decoding a signal for use with a digital video tape recorder.

2. Description of the Prior Art

The following problems are inherent in a digital magnetic recording and reproducing apparatus such as a digital video tape recorder and the like:

1. A maximal frequency of a recorded signal may be increased so high that the recorded signal cannot be read.

2. Direct current components and low frequency components frequently may appear in the recorded signal causing distortion to occur in the reproduced signal when a digital signal is recorded and reproduced by utilizing a rotary transformer. As a result, the reproduced information frequently is considerably different from the recorded information.

3. When digital data is recorded, data series is generally recorded together with a clock component according to a self-clock system. If a digital "1" or "0" is recorded too contiguously, then the error rate in extracting the clock component at the playback side is increased.

In order to solve the above-mentioned problems, a digital magnetic recording and reproducing apparatus has been arranged in accordance with a prior art system described below so as to record and reproduce a digital data signal.

According to such a digital magnetic recording and reproducing apparatus, upon recording, a digital input signal is converted to a recording signal having a predetermined frequency characteristic by a channel coding (recording and encoding) circuit. Then, this recording signal is recorded on a magnetic record medium by a recording head. Upon playback, a signal reproduced from the magnetic record medium by a playback head is supplied to and is reproduced by a decoder whose converting characteristic is opposite to that of the channel coding circuit. The channel coding system may be the Nonreturn to Zero-Inverted (NRZ-I) system, the Interleaved NRZ-I (I-NRZ-I) system or the Scrambled I-NRZ-I (S-I-NRZ-I) system based on a partial response system (PR system) which makes effective use of intersymbol interference in the digital recording.

According to the NRZ-I system, an NRZ signal of binary code form is converted to an NRZ-I recording signal. The encoder which converts the input signal to the recording signal just before the transmission line typically is called a precoder. The NRZ-I system precoder is called a PR (1, -1) encoder because it effects the coding of the conversion opposite the conversion of the PR (1, -1) transmission line based on the partial response system. The NRZ-I system, however, has the disadvantage of a direct current component which frequently increases when the input signal is not inverted.

According to the I-NRZ-I system, an NRZ signal is converted to an I-NRZ-I recording signal. The I-NRZ-I system precoder performs the conversion in reverse to conversion in a PR (1, 0, -1) transmission line based on a class IV partial response. The precoder is called a PR (1, 0, -1) encoder or a class IV partial response encoder.

An identifying signal, which results from recording and reproducing the I-NRZ-I recording signal, has frequency characteristics similar to those of the magnetic recording and reproducing systems. As a result, the identifying signal contains fewer high frequency components and no direct current (DC) components. Further, the identifying signal cannot be affected by the cross-talk component caused by the increased wavelength of the recording signal, nor by the rotary transformer of the head system.

Although the identifying signal reproduced according to the I-NRZ-I system does not contain direct current components, the recording signal of such system does contain direct current components. In order to reduce the direct current component of the recording signal, the S-I-NRZ-I system has been used. According to the S-I-NRZ-I system, by adding the M series signal (represented in the form of binary random number) to the input signal in mod. 2 (or to scramble the input signal by the M series signal), it is possible to reduce the direct current components.

FIG. 1 is referring to FIG. 1 a block diagram showing an arrangement of a prior-art digital video tape recorder using the above-mentioned channel coding circuit of the S-I-NRZ-I system is shown in which an analog video signal is supplied to an input terminal 1. This analog video signal is supplied to an analog-to-digital (A/D) converter 2, for conversion to a digitized data signal. The digitized data signal is supplied through a bit reduction encoder 3 to an error correction code (ECC) encoder 4, in which it is encoded to have a parity code for use during error-correction. The data signal having the parity code is supplied to an M scramble circuit 5 and is thereby converted, for example, to a signal having no direct current (DC) components which correspond to a characteristic of a head-tape system to be described later. The scramble circuit 5 utilizes a so-called M series signal as a pseudorandom signal and hence is called the M scramble circuit. The signal thus converted is supplied to an adder 6, whereby it is added with a synchronizing (SYNC) code from a terminal 7.

The signal having the synchronizing code added is supplied to an adder 8, with the output signal of the adder 8 fed through delay elements 9a and 9b and back to the adder 8. Each of the delay elements 9a and 9b has a sampling cycle D. The adder 8 and the delay elements 9a and 9b constitute a class IV partial response (PR) (1, 0, -1) precoder shown by a broken line block in FIG. 1, thereby effecting the processing of $[1/1 - D^2]$ according to the class IV partial response system.

The output signal from the adder 8 is supplied through a recording amplifier 10 to a recording head 11, and thereby, is recorded on a tape 12.

The recorded signal is reproduced from the tape 12 by means of a playback head 13 and a playback amplifier 14.

The electromagnetic transducing system formed of the recording head 11, the tape 12 and the playback head 13 has a characteristic of $[1-D]$.

The signal from the playback amplifier 14 is supplied through an equalizer 15 to an adder 16, and the signal from the equalizer 15 is supplied through a delay element 17 having a sampling cycle D to the adder 16. The adder 16 and the delay element 17 constitute a class IV partial response (PR) (1, 1) decoder as shown by a broken line block in FIG. 1. Accordingly, when the characteristic [1−D] of the electromagnetic transducing system, formed by the recording head 11, the tape 12 and the playback head 13, is combined with the characteristic [1×D] of the class IV PR (1, 1) decoder, formed of the adder 16 and the delay element 17, there is presented the characteristic [1−D$^2$]. This characteristic [1−D$^2$] is complemetary to the characteristic [1/(1−D$^2$)] of the above-mentioned class IV PR (1, 0, −1) predecoder. Accordingly, the following equation is established.

$$1/(1-D^2) \times (1-D) \times (1+D) = 1$$

Thus, the transmission with transfer function "1" is carried out, and a ternary signal (1, 0, −1) of class IV partial response system is generated.

This ternary signal is supplied to a ternary signal comparator 18 from which there is decoded a signal which is not yet precoded in the recording mode. The thus decoded signal is supplied through an M descramble circuit 19 to a time base corrector 20, in which it is timebase-corrected. The signal from the time base corrector 20 is supplied through an error correction code decoder 21 and a bit reduction decoder 22 to a digital-to-analog (D/A) converter 23, in which it is converted to an analog video signal. This analog video signal is supplied to an output terminal 24.

The signal from the ternary signal comparator 18 is supplied to a synchronizing (SYNC) code detecting circuit 25, and the synchronizing code detected is supplied to a terminal 26.

In the circuit system formed of the circuit elements from the A/D converter 2 to the D/A converter 23 of the prior-art digital video tape recorder, a video signal is processed in a digital fashion in the recording system from the A/D converter 2 to the class IV PR (1, 0, −1) precoder, whereas a video signal is processed in an analog fashion in the reproducing system from the playback head 13 to the ternary comparator 18. A video signal is therefore processed in a digital fashion by a circuit system from the M descramble circuit 19 to the D/A converter 23.

The equalizer 15, the adder 16 and the delay element form the decoder system which processes the video signal in an analog fashion. In the analog data processing, it is frequently observed that errors occur in the data signal due to temperature characteristics and aging changes.

Further, the delay element 17 forming the class IV partial response (1, 1) decoder is formed of an analog delay line so that the delay time of the delay element 17 cannot be varied without difficulty. As a result, when the transmission rate is changed upon cue or in review playback mode, it is difficult to vary the sampling frequency in accordance with the varied transmission rate.

In order to solve the above-mentioned problems, it is proposed that the output signal from the playback amplifier 14 be converted from analog form to digital form so that the circuit elements from the equalizer 15 to the ternary signal comparator 18 perform the processing in a digital fashion. According to sampling the digital processing generally requires a sampling frequency twice as high as the transmission rate of a transmission signal from a sampling theorem standpoint. The digital video tape recorder or the like, in particular, requires a very high sampling frequency, which cannot be realized in practice.

OBJECTS AND SUMMARY OF THE INVENTION

It is an object of the present invention to provide an apparatus for decoding a signal which can overcome the above-mentioned defects of the prior art.

More specifically, it is an object of the present invention to provide an apparatus for decoding a signal in which a signal can be digitally processed in an equalizer or the like at the first stage of the apparatus.

It is another object of the present invention to provide an apparatus for decoding a signal which can reduce influences exerted by temperature characteristics, aging changes or the like and which can carry out the reproducing process.

It is still another object of the present invention to provide an apparatus for decoding a signal which uses a data latch as a delay element to remove an analog delay line, thereby increasing accuracy and providing a reduced manufacturing cost.

It is still another object of the present invention to provide an apparatus for decoding a signal which can cope with the cue playback mode and review playback mode.

It is a further object of the present invention to provide an apparatus for decoding a signal in which the circuit elements thereof can be fabricated as an integrated circuit (IC) with ease.

It is yet a further object of the present invention to provide an apparatus for decoding a signal in which the circuit elements thereof can be fabricated as an integrated circuit (IC) with ease.

It is yet a further object of the present invention to provide an apparatus for decoding a signal in which the circuit elements thereof can be logically designed to promise a highly-efficient circuit arrangement.

According to one aspect of the present invention, there is provided an apparatus for decoding a transmitted signal comprising:

(a) receiver means for receiving said transmitted signal and generating an output digital signal;

(b) filter means for limiting the frequency of the output digital signal of said receiver means within a predetermined frequency range to generate a filtered output signal;

(c) generator means for generating a clock signal with a frequency equal to a transmitting rate of said output transmitted signal;

(d) converter means for sampling the filtered output signal at a frequency defined by said clock signal and for converting the filtered output signal into a binary signal; and (e) process means for decoding said binary signal according to a predetermined method.

According to the present invention, a transmitted signal can be digitally processed by an equalizer or the like, whereby influences such as temperature characteristics and aging changes can be reduced, and a digital signal can be reproduced satisfactorily.

The above, and other objects, features and advantages of the present invention will be apparent from the following detailed description of a preferred embodiment of the invention which is to be read in conjunction with the accompanying drawings, wherein like reference numerals identify like elements.

DETAILED DESCRIPTION OF A PREFERRED EMBODIMENT

An embodiment of an apparatus for decoding a signal according to the present invention will now be described with reference to FIGS. 2 and 3.

Figure 2:
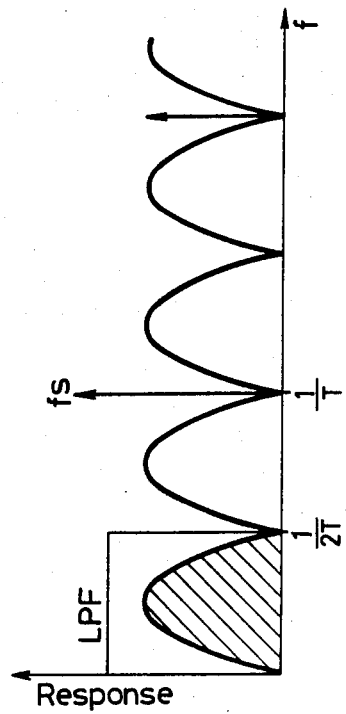
FIG. 2 is a diagram of the frequency spectrum of a reproduced signal used to explain the present invention.

Referring to FIG. 2, the frequency spectrum of a reproduced signal is represented in which 1/2T is a Nyquist frequency and 1/T a transmission rate for a recording and reproducing system employing a Class IV partial response system.

Figure 3:
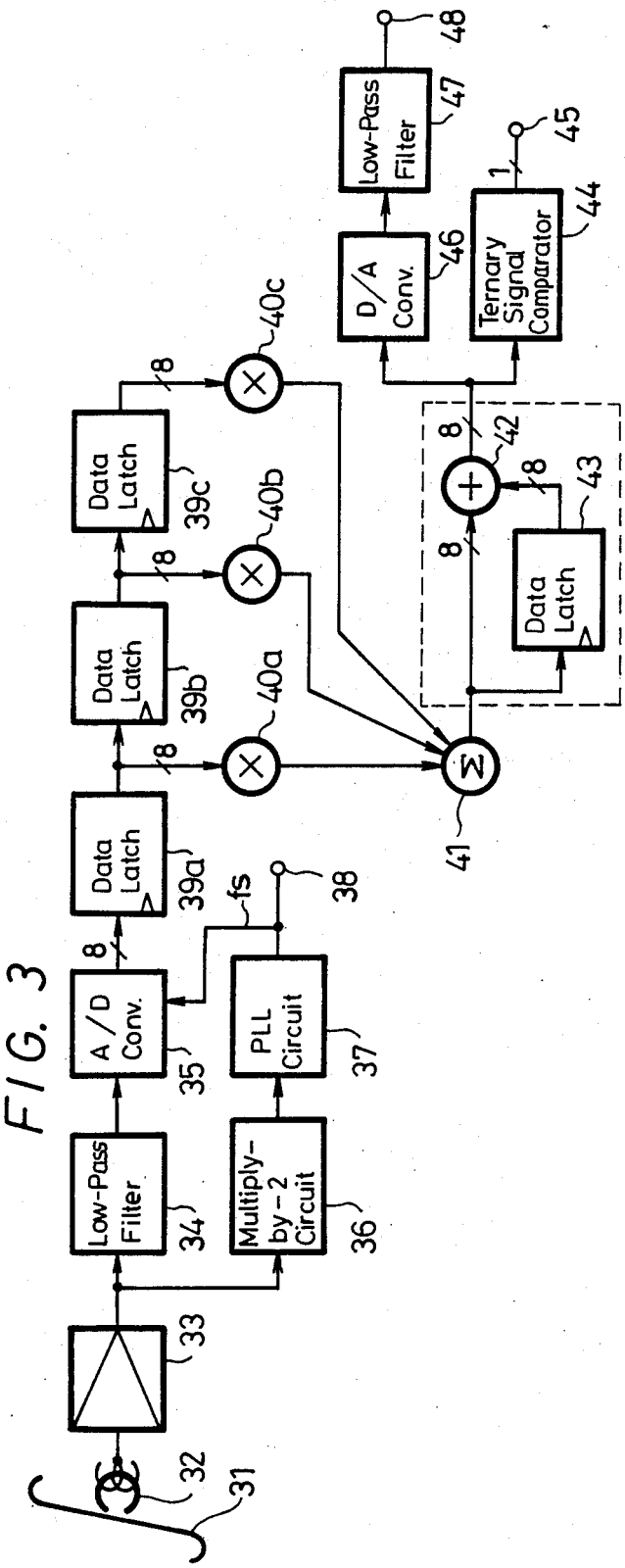
FIG. 3 is a block diagram of an apparatus for decoding a digital signal according to an embodiment of the present invention.

Referring to FIG. 3, an embodiment of the present invention is shown in which a tape 31 has a video signal recorded thereon according to the class IV partial response system. The recorded signal is reproduced from the tape 31 by means of a playback head 32 and a playback amplifier 33.

The signal from the playback amplifier 33 is supplied to a low-pass filter 34 whose cut-off frequency corresponds to the Nyquist frequency of the recorded signal. The signal from the low-pass filter 34 is supplied to an analog-to-digital (A/D) converter 35, in which it is converted to a digital signal. The signal from the playback amplifier 33 also is supplied through a multiply-by-2 circuit 36 to a phase-locked loop circuit 37 which generates a clock signal with the frequency fs equal to the transmission rate. This clock signal is supplied to a terminal 38 as well as to the A/D converter 35. Hence, the A/D converter 35 generates a digitized signal of, for example, 8 bits in response to the clock signal.

The apparatus of the present invention utilizes the class IV partial response system to avoid aliasing noise or the like even when the sampling is effected by the clock signal having the frequency fs equal to the transmission rate.

The digitized signal from the A/D converter 35 is supplied to serially-connected data latch circuits 39a to 39c. The clock signal is supplied to the serially-connected data latch circuits 39a to 39c so that the data latch circuits 39a to 39c generate signals each delayed by the sampling cycle D (transmission rate). These signals are weighted by predetermined weight ratios by weighting circuits 40a to 40c, and then are added together by an adder 41.

The circuit arrangement formed from the latch circuit 39a to the adder 41 constitutes a transversal filter. Thus, a desired equalizer characteristic can be presented by freely determining the coefficients of the weighting circuits 40a to 40c.

The signal from the adder 41 is supplied to an adder 42 and is also supplied to a data latch circuit 43. The clock signal is supplied to the data latch circuit 43, and the output signal of the latch circuit 43 is supplied to the adder 42. The adder 42 and the latch circuit 43 constitute a class IV partial response (PR) (1, 1) decoder as shown by a broken line block in FIG. 3, for performing the decoding expressed as [1+D].

The signal from the adder 42 is supplied to a digital ternary signal comparator 44. One bit of the compared output signal of the comparator 44 is fed to a terminal 45.

Figure 1:
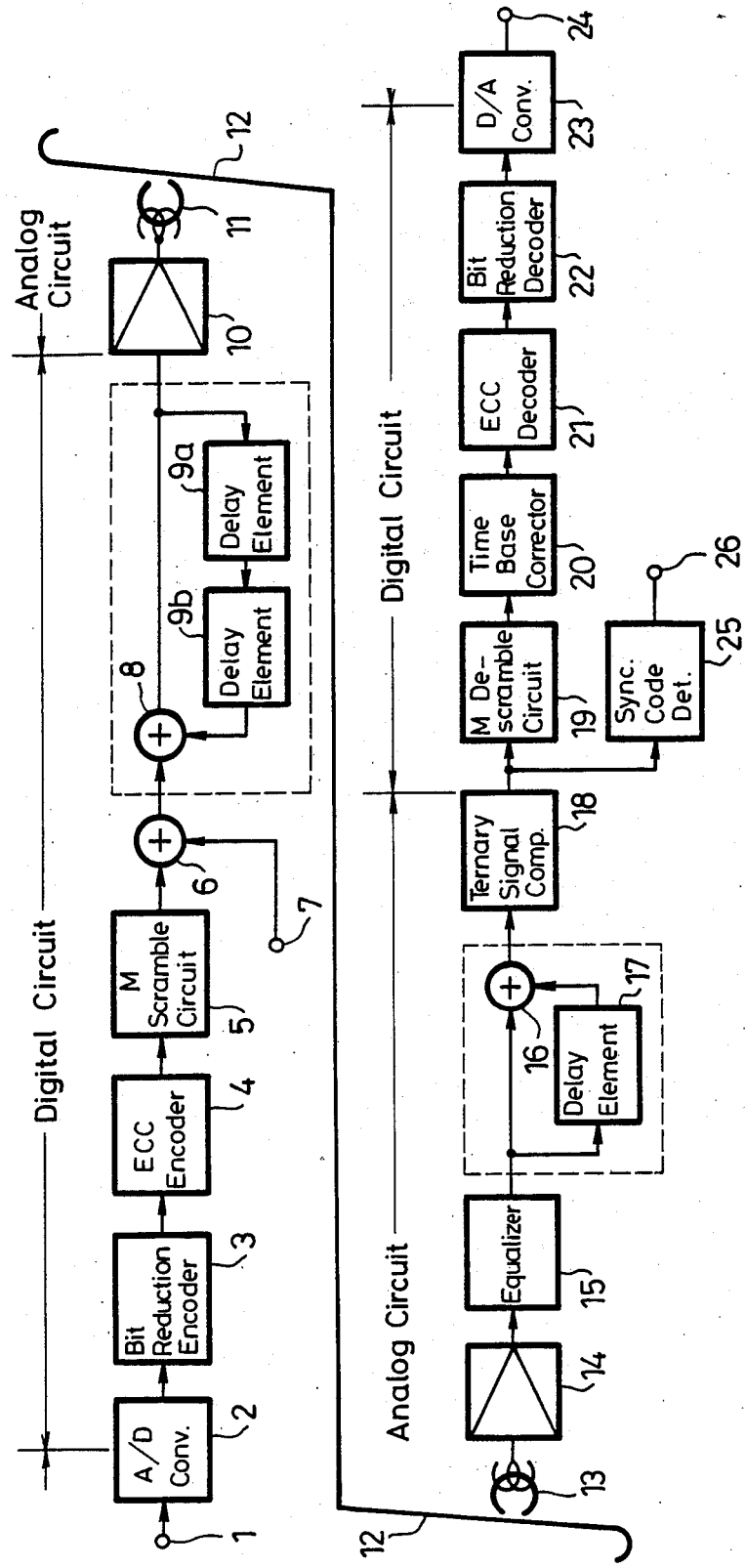
FIG. 1 is a block diagram showing an example of a prior-art digital video tape recorder.

The signal developed at the terminal 45 is supplied to the afore-noted M descramble circuit 19 (see FIG. 1) which reproduces (or descrambles) a video signal.

As described above, according to the above embodiment of the present invention, since the video signal can be digitally processed by the equalizer and so on at the first stage of the apparatus, influences due to temperature characteristics, aging changes and the like can be reduced. Hence, the apparatus of the invention can reproduce the digital signal satisfactorily.

Since in the above embodiment the data latch circuit is removed, resulting in increased accuracy and a decreased cost. Further, the circuit standpoint and also a decreased cost from a manufacturing-process standpoint. Further, the circuit elements of the apparatus can cope with the cue playback mode and the review playback mode with ease.

Furthermore, the circuit elements of the apparatus of the invention can be fabricated as an integrated circuit (IC) and can be logically designed, thus providing a highly-effective circuit capable of a high performance.

In addition, in the above-mentioned circuit arrangement of the present invention, the output signal of the adder 42 is converted to the analog signal by a D/A converter 46, and the analog signal is supplied through a low-pass filter 47 to a terminal 48, whereby an analog eye pattern can be monitored.

It should be understood that the above description is presented by way of example on a single preferred embodiment of the invention and it will be apparent that many modifications and variations could be effected by one skilled in the art without departing from the spirit and scope of the invention as defined by the appended claims.

We claim as out invvention:

1. An apparatus for decoding a transmitted signal, which is precoded in a recording process in accordance with a class IV partial response method, comprising:

receiver means including a magnetic head for receiving said transmitted signal through a magnetic recording medium;

filter means including a low pass filter having a cut-off frequency defined by a Nyquist frequency of said transmitted signal for limiting the frequency of an output signal from said receiver means within a predetermined frequency range and to generate a filtered output signal;

generator means for generating a clock signal with a frequency equal to a transmitting rate of said transmitted signal;

converter means for sampling the filtered output signal at a frequency defined by said clock signal and for converting the filtered output signal into a binary signal; and process means including a transversal filter acting as an equalizer for decoding said binary signal according to said class IV partial response method.

* * * * *